United States Patent
Barr

(10) Patent No.: US 8,593,983 B2
(45) Date of Patent: Nov. 26, 2013

(54) METHOD AND APPARATUS FOR USE OF SILENT SYMBOLS IN A COMMUNICATIONS NETWORK

(75) Inventor: David Barr, San Jose, CA (US)

(73) Assignee: Entropic Communications, Inc., San Diego, CA (US)

( * ) Notice: Subject to any disclaimer, the term of this patent is extended or adjusted under 35 U.S.C. 154(b) by 308 days.

(21) Appl. No.: 13/013,795

(22) Filed: Jan. 25, 2011

(65) Prior Publication Data

US 2011/0182199 A1      Jul. 28, 2011

Related U.S. Application Data

(60) Provisional application No. 61/298,459, filed on Jan. 26, 2010.

(51) Int. Cl.
*H04J 1/16* (2006.01)

(52) U.S. Cl.
USPC .......................................... 370/252; 370/328

(58) Field of Classification Search
None
See application file for complete search history.

(56) References Cited

U.S. PATENT DOCUMENTS

| | | | |
|---|---|---|---|
| 6,538,985 | B1 | 3/2003 | Petry et al. |
| 2002/0031124 | A1 * | 3/2002 | Li ................................. 370/390 |
| 2002/0061031 | A1 | 5/2002 | Sugar et al. |
| 2004/0120302 | A1 | 6/2004 | Sebire et al. |
| 2005/0058150 | A1 * | 3/2005 | Boles et al. .................. 370/445 |
| 2007/0076808 | A1 | 4/2007 | Bhardwaj et al. |
| 2008/0010565 | A1 * | 1/2008 | Jeng et al. ..................... 714/700 |
| 2008/0259957 | A1 | 10/2008 | Kliger et al. |
| 2008/0279219 | A1 | 11/2008 | Wu et al. |
| 2009/0262721 | A1 | 10/2009 | Edwards et al. |
| 2009/0295606 | A1 * | 12/2009 | Boles et al. ..................... 341/50 |
| 2009/0323684 | A1 | 12/2009 | Chu et al. |
| 2010/0142600 | A1 * | 6/2010 | Ahrndt et al. ................. 375/219 |
| 2010/0329108 | A1 * | 12/2010 | Diab et al. .................... 370/216 |

* cited by examiner

*Primary Examiner* — Andrew Lee
(74) *Attorney, Agent, or Firm* — Bruce Greenhaus; Richard Bachand

(57) ABSTRACT

A method for characterizing a communication channel on a communication network includes receiving within a network node at least one silent symbol transmitted together with a packet, and determining within the network node the amount of energy received by the network node during the silent symbol. Determining the amount of energy may include comparing the amount of energy received during a first silent symbol with the amount of energy received during subsequent silent symbols. The packet transmitted with the silent symbol may include a preamble and the silent symbol may be transmitted before the preamble. The packet may include data symbols and the silent symbol may be transmitted for a duration that is shorter than the duration of one data symbol transmitted in the packet.

38 Claims, 3 Drawing Sheets

METHOD AND APPARATUS FOR USE OF SILENT SYMBOLS IN A COMMUNICATIONS NETWORK

CROSS-REFERENCE TO RELATED APPLICATIONS

This application claims the benefit of U.S. Provisional Application No. 61/298,459, filed Jan. 26, 2010, which is herein incorporated by reference in its entirety.

The disclosed method and apparatus relates to communications over a communication network, and more particularly, some embodiments relate to characterizing a communications network.

BACKGROUND

It is important for many reasons well understood by those skilled in the art to characterize the nature of interference that exists in communications networks. One way in which nodes of a communications network characterize the condition of the network, including the amount of interference present, is by sending probes, as is done in accordance with the well-known MoCA (Multimedia over Coax Alliance) standard. However, probes take up valuable resources and may need to be sent frequently in order to identify events that occur during short, sporadic periods of time (commonly referred to as "bursts").

In conventional networks, an inter-frame gap (IFG) occurs between transmissions. The IFG is typically calculated to be as short as possible. The minimum amount of time is dictated by the amount of time required for the channel to become quiet from the last transmission (i.e., for a transmitter to turn off) and the associated receiver of that node to turn on. That is, there is a finite amount of time that is required between the time a node transmits and the time that node will be ready to receive. In addition, there is a finite amount of time required for a node that is receiving during a frame to turn the receiver off and turn a transmitter on and prepare to transmit.

SUMMARY

In some networks that use orthogonal frequency division multiplexing (OFDM) to provide separate subcarriers over which the information is transmitted between nodes, each subcarrier is orthogonal to each other subcarrier. The noise that is present on each subcarrier is also typically unique, however, broadband noise can interfere with several subcarriers. By transmitting at least one "silent symbol", the amount of noise (or interference) present on the subcarrier over which the symbol is transmitted can be measured. A silent symbol is essentially a symbol (or period of time equal to that required to transmit a symbol) during which no energy is transmitted by any of the nodes of the network. In networks, such as the well-known MoCA network, a network coordinator is used to schedule traffic on each subcarrier. By scheduling transmission of a silent symbol, the network coordinator can enable each of the nodes of the network to listen during the silent symbol and determine the noise floor of the network. In one embodiment of the disclosed method and apparatus, receiving nodes measure the energy present during the quiet time of the IFG (i.e., the time during which the transmitter no longer is putting out energy and the next transmitter has not yet started transmitting). In addition, the network coordinator can designate a subcarrier to be a silent subcarrier, and thus allow each of the nodes of the network to measure the noise on that subcarrier. That measurement can then be used to form assumptions as to the amount of interference or level of the noise floor of other subcarriers.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

DETAILED DESCRIPTION

Figure 1:
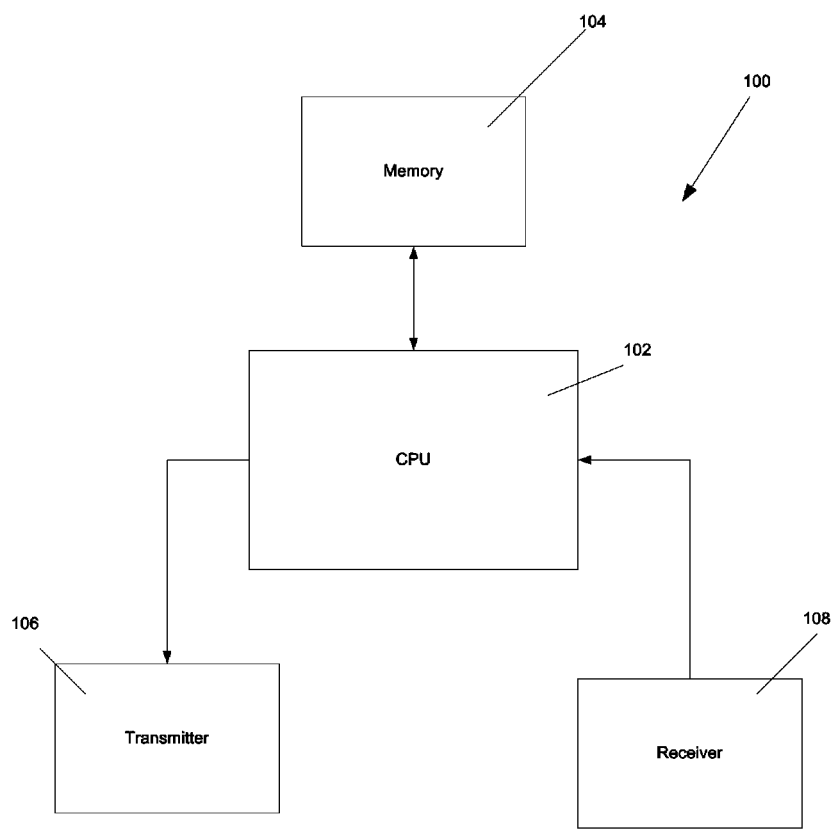
FIG. 1 is a simplified block diagram of a node in accordance with one embodiment of the disclosed method and apparatus.

FIG. 1 is a simplified block diagram of a node in accordance with one embodiment of the disclosed method and apparatus. The node 100 includes a central processing unit (CPU) 102, a memory 104, a transmitter 106 and a receiver 108.

In one embodiment of the disclosed method and apparatus, a receiving node, such as the node 100, within a communications network, such as a MoCA network, may continue digitizing the received energy for one or two additional symbol periods after the normal termination of a transmitted packet. These additional symbol periods can be referred to as "silent symbols".

Figure 2A:
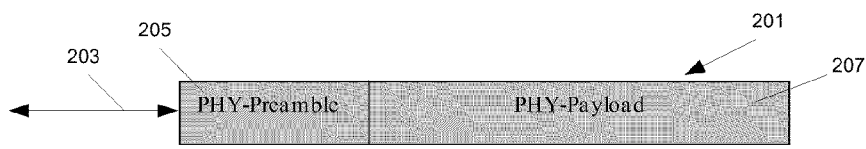
FIG. 2a is an illustration of a first packet and associated inter-frame gap.
Figure 2B:
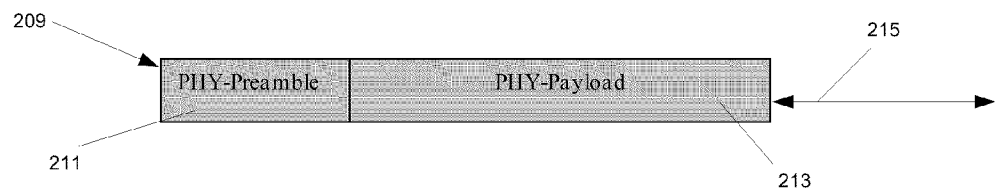
FIG. 2b is an illustration of a second packet and associated inter-frame gap.
Figure 2C:
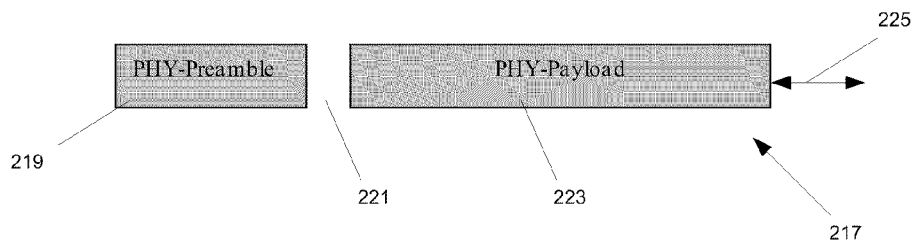
FIG. 2c is an illustration of a third packet and associated silent symbol and inter-frame gap.

In one embodiment, "silent symbols" are transmitted concurrent with an "inter-frame gap" (IFG). FIG. 2a illustrates a first packet 201 having an IFG 203 before a preamble 205. A payload 207 follows the preamble 205. FIG. 2b illustrates a second packet 209 having a preamble 211 and a payload 213. An IFG 215 which follows the payload 213. FIG. 2c illustrates a third packet 217 with a preamble 219 followed by a silent symbol 221, which is then followed by a payload 223. The payload is then followed by an IFG 225.

In accordance with one embodiment of the disclosed method and apparatus, the IFGs 203 and 215 shown in FIGS. 2a and 2b are longer than the amount of time required for the channel to become quiet from the last transmission (i.e., for the transmitter to turn off). In such an embodiment, the IFG 203, 215 is concurrent with a silent symbol. Receiving nodes measure the amount of energy present during the silent symbol. In one such embodiment, the IFG 203, 215 is longer than is necessary to ensure that the previous transmitter is completely off, allowing for a minimum quiet period during which nodes of the network can make measurements of the energy that is present without the effect of any of the nodes of the network transmitting. Alternatively, a silent symbol 221 can be transmitted at any predetermined point within a frame, such as between the preamble 219 and the payload 223, shown in FIG. 2c.

The silent symbol contains little or no energy from the intended transmitter. Accordingly, the receiving node can digitize what is presumed to be the noise floor (i.e., the channel without any node currently transmitting). In accordance with one embodiment, the receiving node performs spectral analysis (e.g., discrete Fourier Transforms (DFTs)) on the silent symbol. In an alternative embodiment, the receiving node performs other processing to analyze the energy received during the silent symbol.

In some cases, the received energy includes energy from transient ingress interference. In one such case, the interference may be narrowband interference from a cellular telephone handset (e.g., a global system for mobile (GSM) handset). This interference is more readily discernable during the silent symbol than it would be during the payload of the transmitted packet. Since the interference is more readily discernable, it will be easier to detect. It will also be easier accurately characterize the interference in order to employ a targeted interference mitigation technique.

In one embodiment, a network coordinator aids in the process of characterizing the interference by increasing the amount of time scheduled between successive transmissions (i.e., the duration of the IFGs 203, 215). The network coordinator can do this by (1) increasing the duration of the IFG 203 215, either after or before the packet transmission, (2) scheduling a terminal allocation unit (TAU) immediately after the transmitted packet, or (3) scheduling time for an extra symbol or two in the packet to be transmitted.

A silent symbol can have a duration shorter (or longer) than that of data symbols in the payload. For example, in the case of MoCA2, data symbols are 512 samples in duration, but the receiving node could optionally receive energy during a shorter silent symbol. In one embodiment the silent symbol is 256 samples. In another embodiment, the silent symbol is 128 samples. However, these are provided only as examples and any number of samples may be used.

In one embodiment, the silent symbol is transmitted after the end of the transmitted packet, but alternatively, the silent symbol might occur before the preamble. In an alternative embodiment, the silent symbol could be transmitted within the packet. In one such embodiment, the silent symbol is transmitted between the preamble and the payload. Alternatively, the silent symbols are placed between the payload symbols. In one embodiment, other nodes receive the same silent symbol for substantially the same purposes.

In one embodiment, the receiving node compares the amount of energy measured during the current silent symbol with the amount of energy measured during previous periods of time, such as from the channel equalization (CE) Symbol (s) in the preamble, data payloads, error vector magnitude (EVM) Probes, silent probes, or other silent symbols. This comparison may make it easier to detect and characterize transient interferers.

In one embodiment, the decay of the previous transmitter is characterized. By characterizing the decay of the previous transmitter, the contribution of the previous transmitter can be subtracted from any measurement that is made during the decay period. Characterizing the decay increases the amount of time during an IFG in which a receiving node can characterize the channel and detect the level of energy on the channel when none of the nodes are transmitting. In addition, the ramp up of the next node to transmit may also be characterized, further reducing the amount of time necessary for a node to determine the amount of energy that is present in the absence of energy injected by a transmitting node. That is, by characterizing the energy contribution of the node transmitting prior to the IFG and the node transmitting just after the IFG, those contributions can be subtracted from the measurement that another node makes during the IFG.

Figure 3:
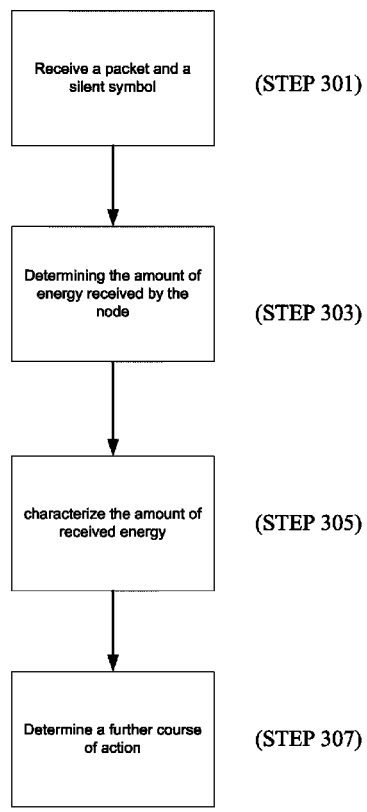
FIG. 3 is a flowchart of one embodiment of the disclosed method and functions of the disclosed apparatus.

FIG. 3 is a simplified flowchart of one embodiment of the disclosed method and functions of the disclosed apparatus. As shown in FIG. 3, a receiving node receives a packet and a silent symbol (STEP 301). The node determines the amount of energy received by the node during the silent symbol (STEP 303). The node then characterizes the amount of received energy (STEP 305) in order to allow the node to determine a further course of action (STEP 307), such as mitigating the effects of interference that might be detected. In one such embodiment, characterizing the amount of received energy includes determining whether there is any interference on the channel. If there is interference, the resulting course of action may be to apply an interference mitigation technique.

Silent Subcarriers:

The transmitting node may zero one or more subcarriers in the payload symbols. It should be understood by those skilled in the art that by zeroing the symbols, these zeroed subcarriers are not transmitted. A receiving node can measure the energy received in the frequency bins of these untransmitted subcarriers. That energy can be presumed to be the noise floor. Any transient ingress interference present at this frequency can more readily be discerned, detected and characterized. In one embodiment, the node zeros particular subcarriers in some known or predetermined sequence. In one embodiment, the sequence repeats from symbol to symbol. In another embodiment, the sequence varies from symbol to symbol. In one such embodiment, the transmitting node zeros a few different subcarriers for each consecutive transmitted symbol.

In another embodiment, the transmitter zeroes particular subcarriers less often than each consecutive transmitted symbol, for example in some predetermined pattern. The sequence of zeroed subcarriers can be constructed to monitor all of the subcarriers used for communication. Alternatively, the sequence can be designed to concentrate on monitoring portions of the communication spectrum that are most likely to be affected by interference. The sequence can be repeated indefinitely over time to provide continuous monitoring. In addition, the sequence can be modified according to conditions observed on the communications channel. New or modified sequences can be distributed among the network nodes. In one embodiment, other nodes determine the amount of energy present during the same silent subcarriers for substantially the same purposes.

One of the known techniques for mitigating interference is to avoid transmitting data bits on the affected subcarriers, for example in response to detection of a transient interferer. The receiving node may monitor the received energy in these frequency bins (referred to as "silent subcarriers") to determine when a transient interferer has transitioned off.

After detecting and characterizing transient interference, the network nodes may decide that the transmitting node should stop transmitting one or more subcarriers in order to cope with the transient interference. In particular, the network coordinator may assign particular nodes to particular subcarriers in response to detected transient interference. In this case, the receiving node would receive and decode the packet without considering the silent subcarriers. However, the receiving node should continue to receive, measure & monitor the energy on these silent subcarriers in order to determine when the transient interference has transitioned off. Depending on the transient nature of the interference, the network nodes may use this information to decide when the silent subcarriers could be returned to normal use.

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for characterize a communication channel on a communication network, comprising:
   a) receiving within a network node at least one silent symbol transmitted together with a packet; and
   b) determining within the network node the amount of energy received by the network node during the silent symbol.

2. The method of claim 1, further including characterizing the amount of received energy in order to determine a further course of action.

3. The method of claim 1, wherein the packet transmitted with the silent symbol includes a preamble and the silent symbol is transmitted before the preamble.

4. The method of claim 1, wherein the silent symbol is transmitted within the packet.

5. The method of claim 4, wherein packet includes data symbols and the silent symbol is transmitted for a duration that is shorter than the duration of one data symbol transmitted in the packet.

6. The method of claim 1, wherein characterizing the amount of received energy includes comparing the amount of energy received during a first silent symbol with the amount of energy received during subsequent silent symbols.

7. The method of claim 1, wherein characterizing the amount of received energy includes comparing the amount of energy received during a first silent symbol with at least one of the following:
   a) channel equalization (CE) Symbol(s) in the preamble;
   b) data payloads;
   c) error vector magnitude (EVM) Probes; or
   d) silent probes.

8. The method of claim 1, wherein the silent symbol occurs after the end of the packet.

9. The method of claim 1, wherein the packet includes a preamble and a payload and the silent symbol is transmitted between the preamble and the payload.

10. The method of claim 1, wherein no power is transmitted by any node in the network during the silent symbol.

11. The method of claim 1, wherein the further course of action includes employing a targeted mitigation technique to mitigate noise detected during the silent symbol.

12. The method of claim 1, further including determining the contribution of a previous transmitter during a decay period.

13. The method of claim 12, further including subtracting the contribution of the previous transmitter during the decay period from the characterized received amount of energy.

14. The method of claim 1, further including determining the amount of energy contributed during a ramp up of a next node to transmit.

15. The method of claim 14, further including subtracting the energy contributed during the ramp up of the previous transmitter from the characterized received amount of energy.

16. A method for characterizing a communication channel on a MoCA communication network, comprising:
   e) receiving within a network node of a MoCA network, instructions from a network coordinator to transmit at least one silent symbol; and
   f) transmitting from the network node at least one silent symbol.

17. The method of claim 16, wherein the duration of the silent symbol is shorter than the duration of a data symbol transmitted in the same packet.

18. The method of claim 16, wherein the duration of the silent symbol is greater than the duration of a data symbol transmitted in the same packet.

19. The method of claim 16, wherein transmitting the silent symbol includes transmitting a packet that includes a preamble and in which the silent symbol is transmitted before the preamble.

20. The method of claim 19, wherein the silent symbol is concurrent with an IFG (inter-frame gap) and the silent symbol includes a period of time during which receiving nodes can measure the amount of energy present.

21. The method of claim 16, wherein the silent symbol is transmitted after the end of the payload.

22. The method of claim 16, wherein the silent symbol is transmitted between the preamble and the payload.

23. The method of claim 16, wherein no power is transmitted by any node in the network during the silent symbol.

24. A method of characterizing a communication channel of a network including:
   a) in a node of the network, zeroing at least one of the subcarriers in the payload symbols; and
   b) transmitting from a transmitting node the at least one subcarrier with the zeroed payload symbols.

25. The method of claim 24, wherein the transmitting node zeros particular subcarriers in a predetermined sequence.

26. The method of claim 25, wherein the transmitting node zeros a few different subcarriers for each consecutive transmitted symbol.

27. The method of claim 26, wherein the sequence of zeroed subcarriers can be constructed to monitor all of the subcarriers used for communication.

28. The method of claim 26, wherein the sequence of zeroed subcarriers can be designed to concentrate on monitoring portions of a communication spectrum for the network.

29. The method of claim 28, wherein the sequence is repeated indefinitely over time.

30. The method of claim 28, wherein the sequence is modified according to conditions observed on the communications channel.

31. The method of claim 30, wherein new or modified sequences can be distributed among network nodes.

32. A method of characterizing a communication channel of a network including:
   a) receiving in a node of the network at least one silent subcarrier transmitted by another node of the network, the payload symbols of the silent subcarrier having been zeroed; and
   b) in the receiving node of the network, measuring the energy received in frequency bins of the at least one silent subcarrier.

33. A method of characterizing a communication channel of a network including:
   a) transmitting instructions from a network coordinator to a network node, the instructions instructing the network node to transmit a silent symbol; and
   b) receiving from the network node an indication of the amount of energy present on a subcarrier on which the silent symbol was transmitted.

34. The method of claim 33, further including determining from the amount of energy whether there is interference present on the subcarrier.

35. The method of claim 34, further including instructing the network node not to transmit information over the subcarrier if there is more than a predetermined amount of interference on the subcarrier.

36. A method of characterizing a communication channel of a network including:
   a) transmitting instructions from a network coordinator to a network node, the instructions instructing the network node to transmit a silent subcarrier; and
   b) receiving from the network node an indication of the amount of energy present on a subcarrier on which the silent subcarrier was transmitted.

37. The method of claim 36, further including determining from the amount of energy whether there is interference present on the subcarrier.

38. The method of claim 37, further including instructing the network node not to transmit information over the subcarrier if there is more than a predetermined amount of interference on the subcarrier.

* * * * *